(12) United States Patent
Aukett et al.

(10) Patent No.: US 7,469,729 B2
(45) Date of Patent: Dec. 30, 2008

(54) INJECTION SYSTEM AND PROCESS

(75) Inventors: Paul Nicholas Aukett, Bracknell (GB); Mirko Kranenburg, Maastricht (NL); Stephen Roy Partington, Walton on Thames (GB); Yves Johann Elizabeth Ramjoie, Roermond (NL)

(73) Assignee: BP Chemicals Limited, London (GB)

( * ) Notice: Subject to any disclaimer, the term of this patent is extended or adjusted under 35 U.S.C. 154(b) by 393 days.

(21) Appl. No.: 10/513,175

(22) PCT Filed: Apr. 16, 2003

(86) PCT No.: PCT/GB03/01646

§ 371 (c)(1),
(2), (4) Date: Nov. 2, 2004

(87) PCT Pub. No.: WO03/092882

PCT Pub. Date: Nov. 13, 2003

(65) Prior Publication Data

US 2006/0076074 A1    Apr. 13, 2006

(30) Foreign Application Priority Data

May 3, 2002    (GB)    .................................. 0210237.4

(51) Int. Cl.
    *B65B 1/04*    (2006.01)
(52) U.S. Cl. .............................. 141/361; 141/9; 141/67; 141/292; 141/301

(58) Field of Classification Search ............. 141/18–20, 141/38, 67, 100, 234, 292, 301, 319, 363–366, 141/2, 9
See application file for complete search history.

(56) References Cited

U.S. PATENT DOCUMENTS

| | | | | |
|---|---|---|---|---|
| 4,666,430 A | * | 5/1987 | Brown et al. | 604/141 |
| 4,867,209 A | * | 9/1989 | Santoiemmo | 141/19 |
| 5,329,975 A | * | 7/1994 | Heitel | 141/19 |
| 5,329,976 A | * | 7/1994 | Haber et al. | 141/25 |

(Continued)

FOREIGN PATENT DOCUMENTS

EP    0 499 759 A1    8/1992

(Continued)

*Primary Examiner*—Timothy L Maust
(74) *Attorney, Agent, or Firm*—Finnegan, Henderson, Farabow, Garrett and Dunner, L.L.P.

(57) ABSTRACT

The present invention relates to an injection system for injecting material into a receiving vessel, said injection system comprising: (i) an injection chamber provided with means to connect to the receiving vessel, and (ii) an injection capsule, adapted to fit within the injection chamber, and comprising a reservoir for the material and a valve, said injection system being adapted so that opening of the valve causes material contained within the reservoir to be injected into the receiving vessel by action of a pressure differential between the injection chamber and the receiving vessel. The present invention also relates to a method of injecting material into a receiving vessel using said injection system.

10 Claims, 2 Drawing Sheets

U.S. PATENT DOCUMENTS

| | | | |
|---|---|---|---|
| 5,374,148 A | | 12/1994 | Kilpeläinen et al. |
| 5,732,752 A | * | 3/1998 | Glessner et al. ............. 141/329 |
| 5,776,359 A | | 7/1998 | Schultz et al. |
| 5,894,869 A | * | 4/1999 | Mussack ...................... 141/19 |
| 5,959,297 A | | 9/1999 | Weinberg et al. |
| 6,063,633 A | | 5/2000 | Willson, III et al. |
| 6,096,002 A | * | 8/2000 | Landau ........................ 604/68 |
| 6,306,658 B1 | | 10/2001 | Turner et al. |
| 7,086,431 B2 | * | 8/2006 | D'Antonio et al. .......... 141/330 |
| 2001/0034067 A1 | | 10/2001 | Dales et al. |

FOREIGN PATENT DOCUMENTS

| | | |
|---|---|---|
| GB | 691500 | 5/1953 |
| WO | WO 98/10866 | 3/1998 |
| WO | WO 01/36087 A1 | 5/2001 |
| WO | WO 02/43854 A2 | 6/2002 |

* cited by examiner

INJECTION SYSTEM AND PROCESS

BACKGROUND OF THE INVENTION

This invention relates to an injection system for injection of a material into a receiving vessel, and to a process for injection of material into said vessel using the injection system.

Catalysts are widely in used in numerous chemical processes at industrial scale. Novel and/or improved catalysts may be discovered and researched by many methods known to those skilled in the art.

Catalyst handling and catalyst addition to a reaction apparatus are common actions to almost any chemical experiment or process involving such a catalyst. Over recent years the advent of combinatorial methods in materials science and of high throughput chemistry techniques, and in particular the growing use of robots and computers to automate catalyst and materials preparation and testing, has allowed researchers to potentially test tens to hundreds to thousands or more catalysts and materials in parallel. Much effort has gone in to developing preparation and testing apparatus for numerous types of materials and material properties (for example U.S. Pat. No. 5,776,359) and, in particular, for chemical reactions of interest (for example see U.S. Pat. Nos. 5,959,297, 6,063, 633 and 6,306,658). However as the number of experiments it may be possible to run in parallel has increased so the bottlenecks in catalyst testing have shifted. For example, collecting, handling and storing of experimental data has become an increasingly important area. As a further example, where a researcher had previously to only make, load and test a few catalysts a day or even in a week, the researcher now has to make a much larger number of catalysts to perform the tests on. In addition, the scale (i.e. volume of catalyst tested) on which high throughput experiments are run has generally decreased inversely to the increase in number of parallel experiments, giving corresponding difficulties in the preparation of a large number of separate small volumes of material. This problem has been addressed to some extent by the use of various robotic techniques and/or other automation to prepare said catalysts.

However, even once the catalyst material is prepared other key bottlenecks include the handling of the catalyst and other materials that have been previously prepared and, in particular, the loading of said materials in to reactors. This is particularly so in relation to the handling and loading of solid materials. We have now found an improved method for injection of materials in to a receiving vessel.

SUMMARY OF THE INVENTION

Thus, according to the first aspect of the present invention there is provided an injection system for injecting material into a receiving vessel, said injection system comprising:

i) an injection chamber provided with means to connect to the receiving vessel, and
ii) an injection capsule, adapted to fit within the injection chamber, and comprising a reservoir for the material and a valve, said injection system being adapted so that opening of the valve causes material contained within the reservoir to be injected into the receiving vessel by action of a pressure differential between the injection chamber and the receiving vessel.

DETAILED DESCRIPTION OF THE INVENTION

Figure 1:
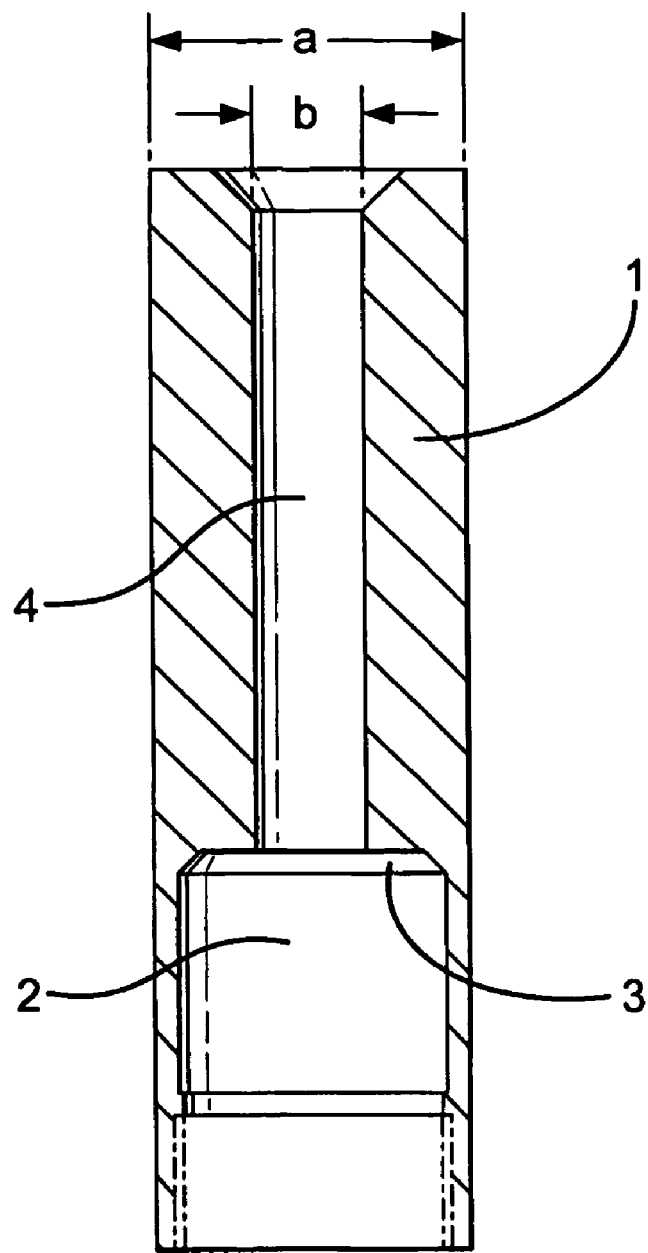
FIG. 1 shows an injection capsule according to one embodiment of the present invention.
Figure 1:
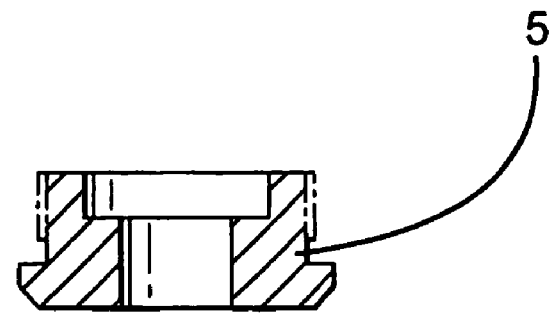

In operation of the injection system there is a pressure differential between the injection chamber and the receiving vessel in to which material is desired to be injected, such that the pressure in the injection chamber is greater than the pressure in the receiving vessel. On opening of the valve in the injection capsule the flow of fluid, for example pressurised gas, from the injection chamber to the receiving vessel due to this pressure differential causes the material within the injection capsule to be carried or forced out of the injection capsule and in to the receiving vessel.

Preferably, the injection system of the present invention may be used to inject material into a receiving vessel which is at greater than atmospheric pressure.

This injection capsule valve may be any suitable valve. In one embodiment the injection capsule valve may be any suitable manually controlled valve i.e. the injection capsule valve may be opened manually once the desired pressure differential has been established. In another embodiment the injection capsule valve may be electrically actuated, such that the valve will open when suitably triggered.

Preferably, the injection capsule valve may be actuated by the pressure differential. In one embodiment an electrically actuated valve may itself be set to depend on the pressure differential, such that the establishment of a suitable pressure differential causes the electrical signal for the valve to be opened. In a preferred embodiment, the injection capsule valve is directly pressure actuated, such that the valve is opened under the pressure of the pressure differential itself. Most preferably, the injection capsule valve comprises a plate that is biased in the closed position when the pressure differential across the plate is substantially zero. For example, the injection capsule valve may comprise a suitable spring and plate assembly, wherein the plate is held in a closed position by the spring when there is no pressure differential.

The injection system of the present invention is especially suitable for delivery of material in the solid form, however it will be readily apparent that the system is equally suitable for injection of material in other forms, for example in liquid form or in slurry form, or a mixture, such as a mixture of a solid and a liquid. Where the materials are in solid form they may be in any suitable solid form, for example as pellets or as powders of varying particle size. Preferably, the solid material to be injected is substantially dry.

The injection system of the present invention may be sized to deliver any appropriate quantity of material. The present invention is however most advantageously used where it is desired to fill receiving vessels with relatively small quantities of particular materials, wherein conventional material handling may be awkward, difficult and/or complex due to the small size of the samples to be injected. In particular where small quantities of material are to be injected it is likely to be desirable to inject substantially all the material in to the receiving vessel without leaving any residual material.

The injection system of the present invention may also be readily automated or semi-automated to inject the material into the receiving vessel. For example, the present invention is particularly advantageous for use with the types of apparatus where use of automation in material injection is desirable. Most preferably, the injection system of the present invention may comprise a plurality of injection chambers configured so as to deliver material to a plurality of receiving vessels, such as 2 or more parallel receiving vessels, preferably more than 5 parallel receiving vessels, or more than 10 receiving vessels. In one embodiment the there may be more than 20, such as more than 50 or 100 receiving vessels The injection capsule may be loaded in to the injection chamber and subsequently removed from the injection chamber by any suitable means. In a preferred embodiment the injection system comprises at least partly automated means for manipulation of the injection capsules, such as, for example, for loading, unloading and/or other handling of the injection capsules.

Preferably, the injection capsule manipulation means comprises a robotic arm the lower part of which is no wider than the inner diameter of the injection chamber. This allows manipulation of the injection capsule by the robotic arm within the injection chamber.

The robotic arm may manipulate the injection capsule using any suitable method. For example, the injection capsule may comprise one or more handles or hooks which may readily interface with the robotic arm.

In a preferred embodiment, the robotic arm manipulates the injection capsule using magnetism. For example, at least part of the injection capsule and at least part of the robotic arm may be made of mutually attractive magnetic materials. For example, the whole of the injection capsule may be magnetic, or only the top of the injection capsule may comprise magnetic material. In another embodiment, the robotic arm comprises an electromagnet. In this embodiment the robotic arm and the injection capsule may be separated by turning off the electromagnet.

In another embodiment, the robotic arm comprises two or more sections, at least one of which comprises a magnet or electromagnet and may be independently retracted, and at least one section which is non-magnetic. Preferably, the robotic arm comprises two sections, one of which is a magnet and one of which is non-magnetic. The non-magnetic section may hold the injection capsule in position in the injection system whilst the remainder of the robotic arm, comprising the magnet, retracts. Once the magnets are separated by a suitable distance the non-magnetic section can itself retract, leaving the injection capsule in place.

Most preferably, the centre of the robotic arm comprises a central (core) section (plunger) and an outer section, which are independently retractable. The plunger is adapted to cover the entrance of the reservoir for the material, for example a plunger which has a base width wider than the hole at the top of the injection capsule and/or fits the entrance to the reservoir. In a preferred embodiment, the injection capsule comprises a frusto-conicular entrance to the reservoir for the material, and the plunger is adapted to fit this shape. By covering the entrance to the reservoir the plunger may act to protect the material within the reservoir during manipulation e.g. protect from spillage or contamination. In addition the frusto-conicular entrance may allow improved ease of loading of material in to the reservoir. Preferably, this plunger is non-magnetic and may hold the injection capsule in position in the injection system whilst the remainder of the robotic arm, comprising the magnet or electromagnet retracts. Once the magnets are separated by a suitable distance the plunger can itself retract.

In a further embodiment the external surface of the injection capsule and the internal surface of the injection chamber may comprise threads, such that the injection capsule may effectively be screwed in to the injection chamber. In this case the top of the injection capsule may comprise a suitable slot that allows the robotic arm to interact and exert a rotational force, for example as with a screwdriver interacting with a screw or similar.

In a preferred embodiment, wherein the injection system comprises a plurality of injection chambers the loading process may be readily repeated to load injection capsules in to other injection chambers as required.

Most preferably, the manipulation means also allows injection capsules to be retrieved from the injection chamber by the robotic arm. Once one injection capsule has been removed from the injection chamber a further injection capsule may, if desired, be loaded in to the injection chamber for injection of further material.

Most preferably, the material to be injected is a catalyst material and the one or more receiving vessels are a suitable reaction apparatus comprising one or more reactors. However although the invention will from herewith be illustrated by reference with a reaction apparatus and to catalyst materials it will be readily apparent to one skilled in the art that the injection capsule and injection system may also be used to inject other materials in to a reaction apparatus or other receiving vessel. These other materials may include, for example, materials such as solvents, reactants, promoters, poisons, quench agents, scavengers, support particles and inert solids. In addition, by catalysts, as used throughout this invention, it is intended to include reference to any materials which may form catalysts or catalytically-active materials after injection, such as individual components of a catalyst system.

The injection system may be adapted for any suitable quantity of material to be injected and for any suitable size of receiving vessel.

As described herein, the present invention is particularly useful where it is desired to inject a relatively small volume of material, especially, for example, where the receiving vessel is one of a plurality of receiving vessels, such as one of a plurality of reaction vessels (reactors). Preferably, each receiving vessel may have a volume of 2.5 liters or less, more preferably 1 liter or less. The receiving vessels preferably have a volume of at least 10 ml, and most preferably have a volume between 10 ml and 500 ml. However, the invention is also applicable to significantly larger reactors or significantly smaller reactors, such as those with volumes above 5 liters or below 1 ml.

Preferably, the volume of the injection chamber is such that, with the injection capsule in place, the volume of pressurising fluid in the chamber above the material to be injected is sufficient to ensure clean injection of the material in to the receiving vessel. In certain aspects, it may also be preferred that the volume of pressurising gas should not be too large relative to the receiving vessel volume, since if the relative volume is too large the pressurising fluid can cause significant perturbations in the conditions in the receiving vessel. For example, where the receiving vessel is a reaction vessel containing a reactant gas and the pressurising gas is an inert gas, such as nitrogen, the use of too large a volume of pressurising gas may cause significant perturbation of reaction conditions and/or reactant dilution when injected.

Preferably, especially where it may be desired to avoid or minimise significant perturbation of the conditions in the receiving vessel, the injection chamber is sized to have a capacity of less than 20% of the reactor volume, such as between 10 and 20% of the reactor volume.

Preferably, each injection capsule may deliver a maximum quantity of catalyst of up to 1 g, such as up to 500 mg to each reactor. More preferably, each injection capsule may deliver a maximum quantity of catalyst material of up to 250 mg, such as up to 100 mg to each reactor.

Preferably, each injection capsule may deliver a minimum quantity of catalyst of down to 0.1 mg or lower, such as down to 0.25 mg. More preferably, the minimum quantity of catalyst may be down to 0.5 mg, such as a minimum of 1 mg.

The catalyst may be injected essentially pure or undiluted. Alternatively, a mixture of catalyst materials may be injected. In addition, the catalyst may also be injected in a "diluted" form. For example, for injection of a solid catalyst the catalyst may be injected with a further solid material that is inert in the reaction of interest. Suitable inerts will be well-known to those skilled in the art for a particular reaction. Preferably, the inert particles will have a similar size to the catalyst particles. In a further preferred embodiment, the catalyst and inert particles are intimately mixed. The catalyst is most preferably injected in diluted form, for example as a mixture with a further inert material, when only a small quantity of catalyst material, such as 25 mg or less, for example, 15 mg or less or 5 mg or less is to be injected. This is particularly preferred where the diluted form may allow easier handling.

Preferably, the injection system for catalyst material also comprises at least partly automated means for manipulation of the injection capsule, for example, as described herein.

It may also be important to know accurately how much catalyst is being injected to the reactor. In a preferred embodiment, the injection system also comprises a means to measure the quantity of material being injected. In a most preferred embodiment, this may comprise a weighing apparatus or weighing station wherein the injection capsules may be weighed when empty and when full of material.

Where the catalyst or other material to be injected comprises material in a liquid form, for example as a pure liquid or as a solution, such as an aqueous solution or as a suspension of solids in a solution, then the quantity of material to be delivered may be measured by mass, as above, or may be measured by volume. For example, a known volume of liquid may be added to the injection capsule using any suitable dispensing system. Preferably, each injection capsule may deliver a maximum volume of liquid of up to 10 ml, such as up to 5 ml, to each reactor. More preferably, each injection capsule may deliver a maximum volume of liquid of up to 1 ml, such as up to 500 µl to each reactor.

Preferably, each injection capsule may deliver a minimum volume of liquid of down to 1 µl or lower, such as down to 10 µl. More preferably, the minimum quantity of liquid may be down to 50 µl, such as a minimum of 100 µl.

The injection capsule and injection system of the present invention may be used with any suitable reaction or catalyst to be studied. For example, the reaction may be performed at any pressure, including atmospheric pressure, or at lower than atmospheric pressure. In a preferred embodiment, the reaction will be one that is operated at greater than atmospheric pressure, such as above 2 bar, above 5 bar or above 10 bar, for example, above 30 bar or even above 50 bar. Where the reaction to be performed is to be operated at greater than atmospheric pressure then the catalyst may be injected in to the reactor at atmospheric pressure, in the presence or absence of other materials, such as solvents, for example, and the reactor subsequently pressurised. Most preferably, the injection system of the present invention may be used to inject catalyst in to a reactor that is at greater than atmospheric pressure. Most preferably, the injection system may be used to inject the catalyst in to the reactor at, or close to, the desired reaction pressure. In a further most preferred embodiment, the catalyst is injected in to the reactor at, or close to, reaction pressure and at, or close to, reaction temperature. This allows a consistent "start" time for the reaction to be obtained where this may be important (for example the time when the catalyst is injected, or after a suitable induction time if required).

A preferred embodiment of the invention will now be illustrated with reference to the figures.

FIG. 1 shows an injection capsule according to one embodiment of the present invention. The injection capsule comprises a cylindrical tube, 1, of outer diameter a and inner diameter b. At the base of the cylinder is the injection capsule valve, 2, which may comprise a plate, 3. Catalyst or other material may be loaded in to the reservoir, 4, in the inner of the cylindrical tube, 1, supported on the plate, 3. The plate will hold the material within the inner region when it is in the closed position, for example, when there is no or only is a low pressure differential on either side. In the open position the plate is configured to allow material past the plate and out of the injection capsule. In a preferred embodiment the injection capsule valve uses a suitable spring assembly 11, such as, for example an assembly similar to that used in a conventional non-return valve to support the plate. The spring assembly may be supported on an end cap, 5, which also has a central hole that lines up with the rest of the injection capsule. In a further preferred embodiment the end-cap, 5, may be removed to allow cleaning, repair or replacement of the seal/valve assembly.

Figure 2:
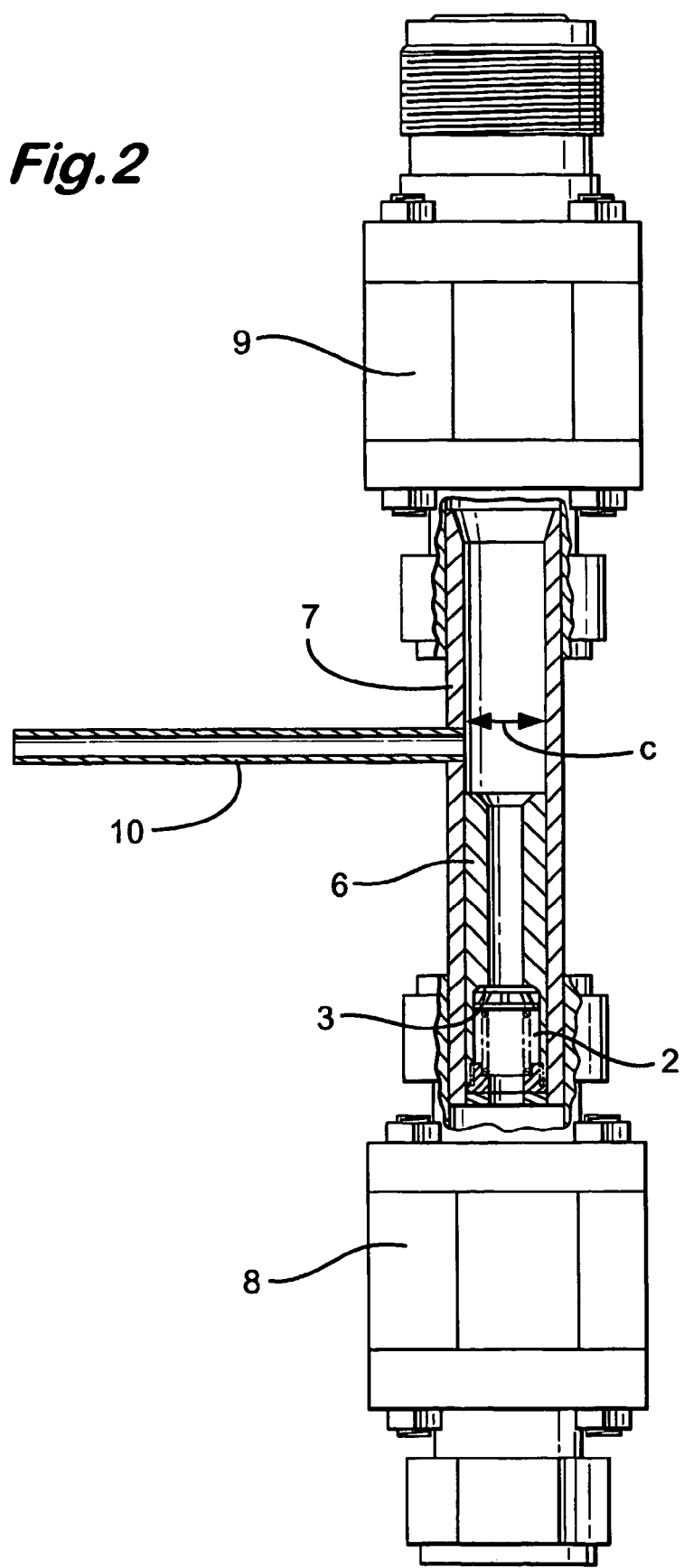
FIG. 2 shows an injection system according to one embodiment of the invention.

FIG. 2 shows an injection system according to one embodiment of the present invention. The injection capsule, 6, sits within the injection chamber, 7 of the injection system. The inner diameter, c, of the injection chamber is fractionally more than the outer diameter, a, of the injection capsule, so that the injection capsule fits closely, but not too tightly within the injection chamber. Beneath the base of the injection capsule is a further valve, 8. Below this valve is means 12 for connecting the chamber 7 to a receiving vessel 13. At the top of the injection chamber is a further valve, 9. Valves 8 and 9 may individually be manually or automatically operated. The injection chamber is also connected to a tube, 10.

In use, with valve 9 open (and valve 8 closed) the injection capsule is carefully loaded through the top of and in to the injection chamber. Due to the nature of the injection system the injection capsule should fit closely within the injection chamber. Once the injection capsule is loaded valve 9 may then be closed.

The injection chamber may then be pressurised through the tube 10 to create the pressure differential between the chamber and the receiving vessel. Preferably this may be done using any suitable gas. In one embodiment this may be a reactant gas for a specific reaction of interest. In a preferred embodiment this may be done with an inert gas, for example, nitrogen or argon.

It is important not to disturb the material in the injection capsule during pressurisation. In addition, due to the close fit of the injection capsule within the injection chamber gas may only slowly permeate through and pressurise the area below the injection capsule valve, 2. Therefore it is preferred to pressurise the injection chamber so as to ensure even pressurisation and no disturbance of the material, for example by pressurising slowly. Alternatively the injection capsule may be provided with a cover or cap which may protect the top of the injection capsule during pressurisation (and also general handling as described throughout this specification). This cover or cap may be removed or otherwise opened once the system has been fully pressurised.

In an alternative embodiment the injection chamber may be pressurised through more than one tube. For example, in one embodiment there may be additional tubes for pressurisation of the injection chamber below the plate, 3, so that this area may be pressurised through a separate tube attached to the area below the injection capsule valve, such as attached to valve 8. This area is preferably pressurised at approximately the same rate as the upper area. Additionally or alternatively there may be more than one tube attached to the upper area so as to improve the pressurisation of the upper area of the injection chamber. In a further embodiment the injection chamber may be pressurised using more than one gas, either as a mixture, sequentially through the same tube, or through different tubes.

In still another embodiment the injection chamber may be filled and pressurised in whole or in part using a pressurised liquid. For example, this may be desirable where the material is a "sticky" solid. Using liquid to inject the solid may reduce the amount that is retained within the injection capsule.

The injection chamber should be pressurised to a pressure greater than the pressure in the receiving vessel below, such as at least 2 bar above, but preferably at least 5 bar above the pressure in the receiving vessel. Most preferably the injection chamber should be pressurised to at least 10 bar greater than the pressure in the receiving vessel.

After the injection chamber has been pressurised, and allowed to equilibrate if required (for example, where a liquid is present and is pressurised with gas some of the gas may dissolve in the liquid) valve 8 may be opened to inject the material in to the receiving vessel.

Due to the pressure differential between the injection chamber above the injection capsule and the receiving vessel below, and further due to the close fit of the injection capsule in the injection chamber the gas above the injection capsule will be forced to push through the centre of the injection capsule, and will inject any material within the injection capsule in to the receiving vessel.

In one embodiment valve 8 may be closed immediately after injection. In an alternative embodiment further gas or liquid may be used to flush through the injection capsule.

In yet another embodiment, once valve 8 is closed the injection capsule may be removed from the injection chamber. A further injection capsule may then be loaded if it is required to inject further material, for example, fresh or additional catalyst, solvent or reactants, or a quench agent for a reaction.

In a preferred embodiment the injection system comprises a cleaning system to clean the injection chamber once the injection capsule has been removed. In one embodiment this may be done using a vacuum, for example through tube 10 or a similar tube. In another embodiment the injection chamber may be filled with a suitable solvent liquid, which may then be removed, for example by vacuum. In another embodiment any solvents and/or vacuum means may be introduced using a robotic arm and by opening valve 9, such as a liquid handling robot.

The present invention also provides a process for injecting materials in to one or more receiving vessels using an injection system as defined herein, said process comprising:

i) providing an injection capsule, containing the material to be injected, within the injection chamber, ii) pressurising the injection chamber to a pressure above that in the receiving vessel, and iii) opening a valve so that material is injected in to the receiving vessel.

Preferably the process may also comprise one or more steps in which one or more materials may be loaded in to the injection capsules and/or may be weighed within the injection capsules and/or may otherwise be measured in to the injection capsules, for example, by liquid volume.

The entire process may, if necessary, be performed in an inert atmosphere, such as in a glove box.

Preferably, the receiving vessel is at greater than atmospheric pressure. The injection chamber may be pressurised to a pressure above that in the receiving vessel using an inert gas. Preferably, the injection chamber is pressurised to a pressure at least 5 bar above the pressure in the receiving vessel.

Preferably, the process of providing an injection capsule in step (i) comprises loading of the injection capsule using a robotic arm the lower part of which is no wider than the inner diameter of the injection chamber. The process for injecting materials may further comprise retrieving the injection capsule from the injection chamber after injection of the material in to the receiving vessel, for example, using a robotic arm the lower part of which is no wider than the inner diameter of the injection chamber.

Preferably, the receiving vessel is a suitable reaction apparatus comprising a reactor and the material is selected from catalyst materials, solvents, reactants, promoters, poisons, quench agents, scavengers, support particles or inert solids, more preferably a catalyst material.

Most preferably, the material is a polymerisation catalyst and the receiving vessel is a polymerisation reactor containing one or more monomer reactants.

This process is illustrated below with respect to loading of catalysts in to a reaction apparatus, but it will be readily apparent that this may equally apply to other materials and receiving vessels.

Where a solid catalyst is to be used an empty injection capsule may be pre-weighed using any suitable weighing process. Although this may be done manually, it is preferably done automatically using any suitable automated weighing apparatus. The injection capsule is then loaded with a catalyst material and re-weighed. Again this process may be manual but is preferably at least partly automated, most preferably fully automated.

The solid catalyst material may comprise an undiluted or a diluted catalyst, for example a solid intimately mixed with an inert of similar particle size. As long as mixing ratio or concentration of catalyst in the diluted sample (e.g. g catalyst/g sample) is known the amount of actual catalyst material loaded may be easily calculated from the respective weights of the loaded and unloaded injection capsule.

After weighing of the solid catalyst a further layer comprising a small amount of non-catalyst material may preferably be added to the top of the injection capsule. This may be any material that is inert in the specific reaction, but is preferably an inert anti-static material, such as any suitable salt.

This layer helps to protect the solid catalyst material during handling and injection.

Where a liquid is used as a catalyst, the liquid weight may be calculated similar to above, or the volume of catalyst may be used.

The injection capsule may then be picked up by a robotic arm, preferably using magnetism to hold the injection capsule. The lower part of the robotic arm has a smaller diameter than the inner diameter of the injection system. Preferably the base of the robotic arm completely covers the hole at the top of the injection capsule to protect the catalyst during transport and loading in the injection system.

The injection capsule is carefully lowered in to an injection chamber in the injection system of the present invention. The robotic arm may repeat this process for further injection capsules to be loaded in other reactors.

The loaded injection chamber(s) may be pressurised, and the catalyst(s) injected as described above.

After the injections the injection capsule(s) may be retrieved from the injection chamber(s) by reversing the loading process. The robotic arm is slowly lowered in to the injection chamber until it contacts the injection capsule. The robotic arm lifts the injection capsule out of the injection chamber.

In a most preferred embodiment, if required, the injection capsule may be transported to a suitable location for cleaning of the injection capsule, for example for washing of the injection capsule.

In a further aspect, the present invention also provides an injection capsule for use in the injection system as described herein.

EXAMPLES

Experimental

The following examples were performed in a 270 ml autoclave to which is attached an injection system according to the present invention. The injection chamber and the autoclave may be isolated from one another via a valve.

The autoclave and injection chamber were situated directly below a glove box used for making up the catalyst mixtures. All catalyst handling is performed under an inert atmosphere.

All gases and reagents used were of polymerisation grade.

Example 1

Injection of Dry Catalyst in Gas Phase Process (Ziegler LLDPE)

0.2 mmol triethylaluminium (TEA) was added to the autoclave at 30° C. which already contained 60 g of pre-dried sodium chloride. The autoclave was heated to 85° C. and then pressurised to a total pressure of 5.9 bar with a composition of 71.4% v/v ethylene, 17.9% v/v hydrogen and 10.7% v/v hexene (as measured by a mass spectrometer).

20 mg of a supported Ziegler polyethylene catalyst (catalyst A) was mixed with 980 mg of a solid diluent (TEA treated silica) in the nitrogen glove box and loaded into an injection capsule.

The injection capsule was transferred in to an injection chamber at atmospheric pressure via the use of a magnetised rod comprising a non-magnetic core section (plunger) and a magnetic outer section, which are independently retractable. The injection chamber was then pressurised with nitrogen to 10 bar above the autoclave pressure. The valve between the autoclave and the injection chamber was then opened allowing the catalyst and TEA treated silica mixture to be injected into the autoclave. The pressure in the autoclave increased to 7.24 bar during the injection and then the autoclave pressure was controlled at this increased pressure by addition of further reactant gas composition as required to maintain this pressure. The test was allowed to proceed for 60 minutes at constant pressure and composition, and under fluidisation conditions.

The product was removed at the end of the test by venting the reactant gases, cooling the autoclave to 30° C. and opening a valve on the bottom of the autoclave. The autoclave was cleaned for the next test by washing with 200 ml of heptane. All solid and liquid material from the autoclave was collected.

After evaporating the heptane the sodium chloride was removed by washing with water. 10.2 g of LLDPE product was obtained The injection capsule was removed from the injection chamber by venting any pressurised gas remaining in the injection chamber and using the magnetic rod to remove the injection capsule. Any residual solid material in the injection chamber was removed by using a vacuum line.

On removal of the autoclave no significant deposits were seen on the walls below the valve leading into the autoclave.

Example 2

Injection of Dry Catalyst in Gas Phase Process (Metallocene LLDPE)

The autoclave containing 60 g of pre-dried sodium chloride and at 75° C. was pressurised to a total pressure of 6.5 bar with the composition of 99.1% v/v ethylene, 0.3% v/v hydrogen and 0.6% v/v hexene (as measured by a mass spectrometer).

10 mg of a supported metallocene polyethylene catalyst (catalyst B) was mixed with 980 mg of a solid diluent (TEA treated silica) in the nitrogen glove box and loaded into an injection capsule. A further 100 mg of dried sodium chloride was added on top of this mixture in the injection capsule to eliminate any problems of static during transfer of the injection capsule to the injection chamber.

The injection capsule was transferred in to an injection chamber at atmospheric pressure via the use of a magnetised rod comprising a non-magnetic core section (plunger) and a magnetic outer section, which are independently retractable. The injection chamber was pressurised with nitrogen to 10 bar above the autoclave pressure and the valve to the autoclave was opened allowing the catalyst and TEA treated silica to be injected into the autoclave. The pressure in the autoclave increased to 8.6 bar and the autoclave pressure was then controlled at this increased pressure by addition of further reactant gas composition as required to maintain this pressure. The test was allowed to proceed for 60 minutes at constant pressure and composition, and under fluidisation conditions.

The product was removed at the end of the test by venting the reactant gases, cooling the autoclave to 30° C. and opening a valve on the bottom of the autoclave. The autoclave was cleaned for the next test by washing with 200 ml of heptane. All solid and liquid material from the autoclave was collected.

After evaporating the heptane the sodium chloride was removed by washing with water. 6.4 g of LLDPE product was obtained.

The injection capsule was removed from the injection chamber by venting the pressurised gas remaining in the injection chamber and using the magnetic rod to remove the injection capsule. Any residual solid material in the injection chamber was removed by using a vacuum line.

On removal of the autoclave no significant deposits were seen on the walls of the tubing below the valve leading into the autoclave.

Example 3

Injection of Dry Catalyst in Slurry Phase Process (Ziegler LLDPE in Isobutene Solvent)

12.2 g of dried glass beads (2 mm diameter) was added to the autoclave to fill up the dead space at the bottom of the autoclave during reaction. 10 ml of anhydrous pentane was added to the autoclave to fill up the dead volume around the glass beads.

Triethylaluminium (2 mmol) was added to the autoclave followed by 20 ml of hexene and 150 ml of isobutene. The autoclave was heated to 85° C. and then hydrogen was added to 0.62 bar and ethylene added to 7 bar above the pressure of the isobutene/hexene.

14 mg of a supported Ziegler polyethylene catalyst (catalyst C) was mixed with 980 mg of solid diluent (TEA treated silica) in a nitrogen glove box and loaded into an injection capsule.

The injection capsule was transferred in to an injection chamber at atmospheric pressure via the use of a magnetised rod comprising a non-magnetic core section (plunger) and a magnetic outer section, which are independently retractable. The injection chamber was then pressurised with nitrogen to 10 bar above the autoclave pressure and the valve to the autoclave was opened allowing the catalyst and TEA treated silica into the autoclave. The pressure in the autoclave increased and the autoclave pressure was then controlled at this increased pressure by addition of further reactant gas composition as required to maintain this pressure. The test was allowed to proceed for 35 minutes at constant pressure and composition.

The product was removed at the end of the test by venting the reactant gases and isobutane, cooling to 30° C. and opening a valve on the bottom of the autoclave. The autoclave was cleaned for the next test by washing with 200 ml of heptane. All solid and liquid material from the autoclave was collected.

On evaporating the heptane 13.5 g of LLDPE product was obtained. The injection capsule was removed from the injection chamber by venting the pressurised gas remaining in the injection chamber and using the magnetic rod to remove the injection capsule. Any residual solid material in the injection chamber was removed by using a vacuum line.

On removal of the autoclave no significant deposits were seen on the walls of the tubing below the valve leading into the autoclave.

Example 4

Injection of Dry Catalyst in Slurry Phase Process (Ziegler LLDPE in Heptane Solvent)

12.2 g of dried glass beads (2 mm diameter) was added to the autoclave to fill up the dead space at the bottom of the autoclave during reaction. Dried heptane (120 ml) was then added to the autoclave Triethylaluminium (0.75 mmol) was added to the autoclave followed by 20 ml of hexene. The autoclave was heated to 85° C. and then hydrogen was added to 1 bar and ethylene added to 4 bar above the pressure of the heptane/hexene.

11.5 mg of a supported Ziegler polyethylene catalyst (catalyst C) was mixed with 980 mg of solid diluent (TEA treated silica) in a nitrogen glove box and loaded into an injection capsule.

The injection capsule was transferred in to an injection chamber at atmospheric pressure via the use of a magnetised rod comprising a non-magnetic core section (plunger) and a magnetic outer section, which are independently retractable. The injection chamber was pressurised with nitrogen to 10 bar above the autoclave pressure and the valve to the autoclave was opened allowing the catalyst and TEA treated silica into the autoclave. The pressure in the autoclave increased and the autoclave pressure was then controlled at this increased pressure by addition of further reactant gas composition as required to maintain this pressure. Activity was seen and the test was allowed to proceed for 60 minutes at constant pressure and composition.

The product was removed at the end of the test by venting the reactant gases, cooling to 30° C. and opening a valve on the bottom of the autoclave. The autoclave was cleaned for the next test by washing with 200 ml of heptane. All solid and liquid material from the autoclave was collected.

On evaporating the heptane 4.9 g of LLDPE product was obtained. The injection capsule was removed from the injection chamber by venting the pressurised gas remaining in the injection chamber and using the magnetic rod to remove the injection capsule. Any residual solid material in the injection chamber was removed by using a vacuum line.

On removal of the autoclave no significant deposits were seen on the walls of the tubing below the valve leading into the autoclave.

The invention claimed is:

1. An injection system for injecting material into a polymerization reactor, said injection system comprising:
   i) a polymerization reactor for the polymerization of one or more monomer reactants;
   ii) an injection chamber provided with means to connect the injection chamber to the polymerization reactor,
   iii) an injection capsule, adapted to fit within the injection chamber, and including a reservoir for the material and a valve, and
   iv) means for creating a pressure differential between the injection chamber and the polymerization reactor so that on opening of the valve of the injection capsule a flow of fluid occurs from the injection chamber into the polymerization reactor due to said pressure differential, which flow of fluid causes the material contained within the reservoir of the injection capsule to be forced out of the injection capsule and injected into the polymerization reactor along with said flow of fluid.

2. The injection system according to claim 1, wherein the injection capsule valve is actuated by the pressure differential between the injection chamber and the polymerization reactor.

3. The injection system according to claim 2, wherein the injection capsule valve comprises a spring and plate assembly, wherein the plate is held in a closed position by the spring when there is no pressure differential.

4. The injection system according to claim 1, which further comprises at least partly automated means for manipulation of the injection capsule.

5. The injection system according to claim 1, wherein the material to be injected is catalyst materials, solvents, reactants, promoters, poisons, quench agents, scavengers, support particles or inert solids.

6. The injection system according to claim 5, wherein the material to be injected is a catalyst material.

7. The injection system according to claim 1, wherein the polymerization reactor has a volume of between 10 ml and 500 ml.

8. The injection system according to claim 1, wherein the injection chamber has a capacity of between 10 and 20% of the volume of the polymerization reactor.

9. The injection system according to claim 1, which comprises a plurality of injection chambers configured so as to deliver material to a plurality of polymerization reactors.

10. A process for injecting materials into a polymerization reactor using an injection system as defined in claim 1, said process comprising:

i) providing an injection capsule, containing the material to be injected, within the injection chamber,
ii) pressurizing the injection chamber to a pressure above that in the polymerization reactor which is greater than atmospheric pressure, and
iii) opening the valve so that the material is injected into the polymerization reactor.

* * * * *